J. V. DODSON.
TRAP NEST.
APPLICATION FILED DEC. 11, 1913.

1,131,124.

Patented Mar. 9, 1915.

Witnesses
G. M. Spring
W. E. Valk Jr.

Inventor
John V. Dodson,
By Richard Bowen
his Attorney

UNITED STATES PATENT OFFICE.

JOHN V. DODSON, OF NORWICH, KANSAS.

TRAP-NEST.

1,131,124.   Specification of Letters Patent.   Patented Mar. 9, 1915.

Application filed December 11, 1913. Serial No. 806,025.

*To all whom it may concern:*

Be it known that I, JOHN V. DODSON, citizen of the United States, residing at Norwich, in the county of Kingman and State of Kansas, have invented certain new and useful Improvements in Trap-Nests, of which the following is a specification.

This invention relates to an improved poultry trap nest wherein a trap door is mounted to automatically close upon the entrance of a fowl into the nest, the weight of the fowl being sufficient to actuate the several levers employed for the purpose of controlling the movement of the door.

A further object of the invention contemplates the provision of a trap nest wherein the nest proper is supported in such a novel and peculiar manner as to control the movement of the nest door, a suitable catch member being provided to retain the said door in closed position when once sprung by the entrance of a fowl, the said catch member being operable exteriorly of the nest to reopen the door when so desired.

The invention still further resides in the provision of a nest of the character described wherein the several embodiments are arranged or assembled in a neat, compact and efficient manner so as to simplify the construction as well as the operation and reduce the cost of manufacture of the nest to a minimum.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1:
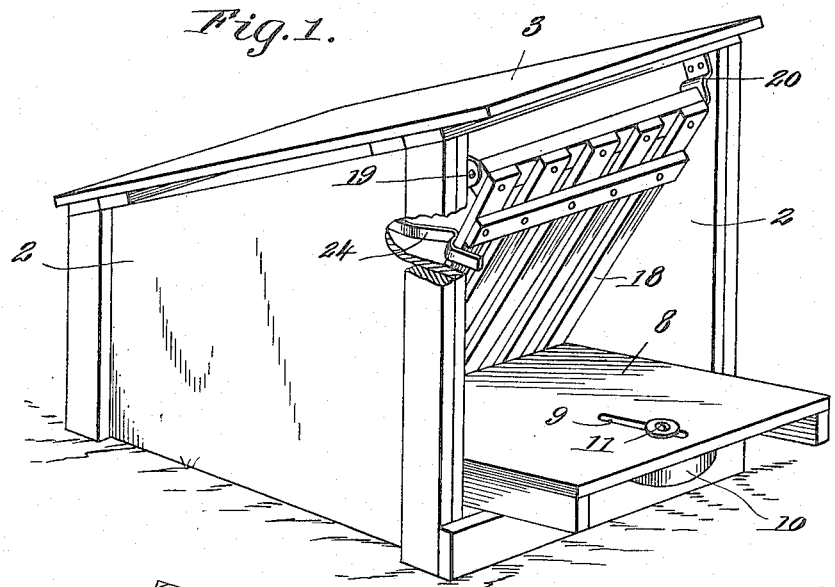
Figure 2:
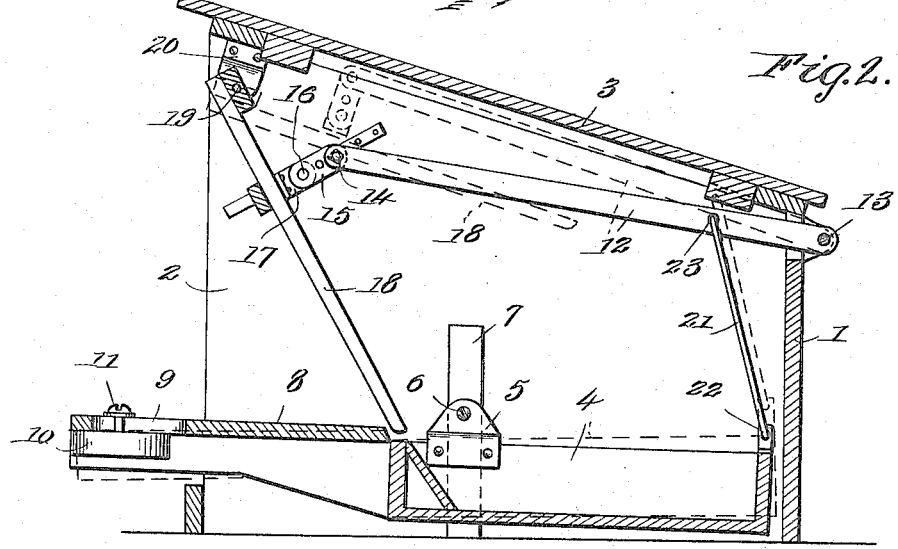

Figure 1 is a perspective view, partly broken away, of a trap nest constructed in accordance with my invention; and Fig. 2 is a longitudinal sectional view of the nest as illustrated in Fig. 1.

Referring now to the drawings wherein is illustrated the preferred embodiment of my invention the numeral 1 designates the back, 2 the sides and 3 the top of the nest, the latter being removable to render a cleaning of the interior of the nest possible. The nest proper designated by the numeral 4 is supported near the bottom of and between the sides 2 of the nest through the medium of brackets 5, disposed, one upon each side of the nest and pivotally connected as at 6 to uprights 7 provided therefor. A suitable platform 8 extends forwardly of the nest 4 and is provided with a slot 9 disposed centrally therein. To render adjustment of the nest 4 possible, a weight member 10 is provided and adjustably supported beneath the platform 8 by means of a pin or screw 11 extending transversely through the said slot 9, which arrangement will permit longitudinal adjustment of the said weight member as occasion demands.

An operating lever 12 is pivotally supported as at 13 and disposed to extend forwardly from the back 1 of the nest to a point 14 where it is in turn pivotally secured to a link 15 the opposite end of which is likewise pivotally secured as at 16 to a suitable bracket 17 carried by the trap door 18 of the nest, the said door being pivotally supported as at 19 between brackets 20 fixedly secured, one upon each side 2 of the nest as illustrated to advantage in Fig. 1 of the drawings. A link or connecting rod 21 is disposed at the rear of the trap nest, one end of the rod being connected as at 22 to the nest proper 4 and the opposite end as at 23 to the operating lever 12 at a point adjacent the pivot point 13. By this arrangement of the links and levers it will be seen that the said lever 12 is actuated according to the movement of the nest 4, and as the said operating lever is connected to the trap door 18 by means of the link 15 above mentioned, it will be seen that the said door is swung into closed position should the said nest 4 be actuated. In operation, the door 18 is maintained in elevated position, or in the position indicated by the dotted lines in Fig. 2 by the weight member 10, the said member causing the rear end of the nest 4 to be slightly elevated which will in turn slightly elevate the operating lever 12. As the said lever 12 is maintained in raised position, the door 18 is likewise supported as the said lever is pivotally connected thereto at its forward end. Should a fowl enter the nest, the weight imposed upon the nest proper 4 will cause the rear end of the said nest to be depressed, which movement will actuate the operating lever 12, cause the latter to be pulled downwardly and thereby automatically close the door 18 as is illustrated in the drawings; a suitable catch member 24 being provided to maintain the said door in closed position and to entrap the fowl within the nest. By depressing the catch member 24 from the exterior of the nest, it will be seen that the door 18 will automatically return to its normal raised position as the weight of the member 10 is sufficient to offset the weight of the nest 4 and thereby elevate the rear end of the said nest and actuate the several links and levers connecting the nest to the door.

From the above, taken in connection with the accompanying drawings it will be seen that the door 18 is automatically operated by the entrance of a fowl to the interior of the nest; that a minute adjustment may be effected by laterally adjusting the weight member 10 with respect to the platform 8 beneath which it is supported; and that a removal of the fowl from the nest interior may be effected by first releasing the catch and then pressing down on the platform 8 or by removing the cover 3 of the nest.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

A poultry trap nest including a box like frame open at one end, a nest fulcrumed within the frame, a weighted platform projecting forwardly of the nest, the platform being elevated slightly above the nest to form an abutment, a door pivoted to swing inwardly, the abutment serving as a stop means limiting outward movement of the door and maintaining the door at an angle when closed, a link rigid with the door adjacent its pivot point, said link extending at a right angle thereto, a lever pivoted at one terminal to the free end of the link and at its opposite terminal to the frame at a point adjacent the rear top portion thereof, and a rod connected to the lever adjacent its point of connection with the frame, said rod being connected to the nest whereby to bodily move the lever and the link to raise and open the door upon movement of the nest against action of the weight, as and for the purpose set forth.

In testimony whereof I affix my signature in presence of two witnesses.

JOHN V. DODSON.

Witnesses:
N. I. FARRIS,
E. L. FEAGAN.

Copies of this patent may be obtained for five cents each, by addressing the "Commissioner of Patents, Washington, D. C."